Sept. 10, 1963

A. IVANOFF 3,103,179

PUMPS

Filed Aug. 29, 1961

INVENTOR
ALEXANDER IVANOFF
By Hane and Nydick
ATTORNEYS

INVENTOR
ALEXANDER IVANOFF

BY Hane and Nydick
ATTORNEYS

Sept. 10, 1963 A. IVANOFF 3,103,179
PUMPS
Filed Aug. 29, 1961 3 Sheets-Sheet 3
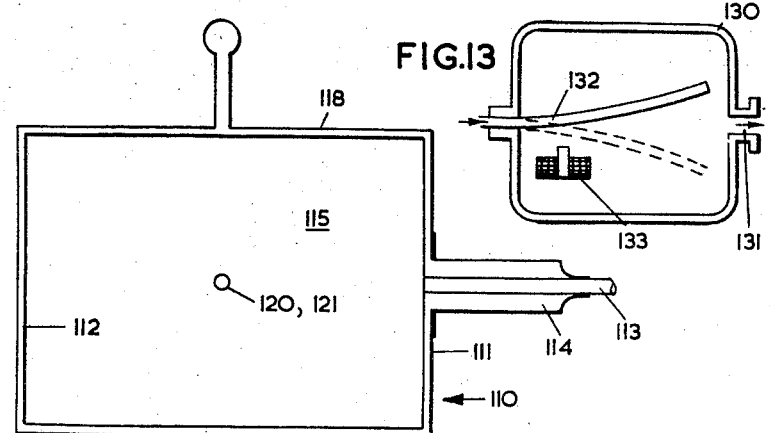
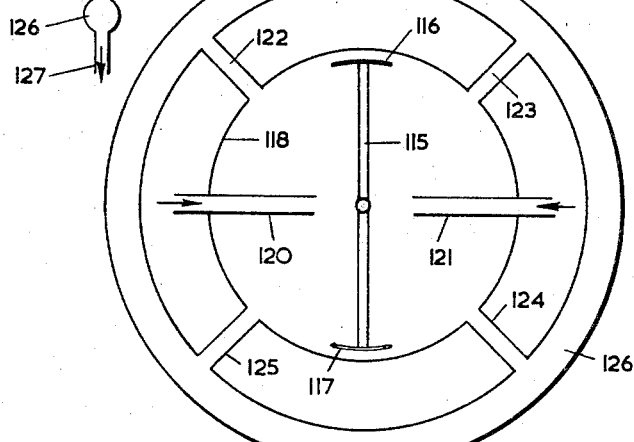
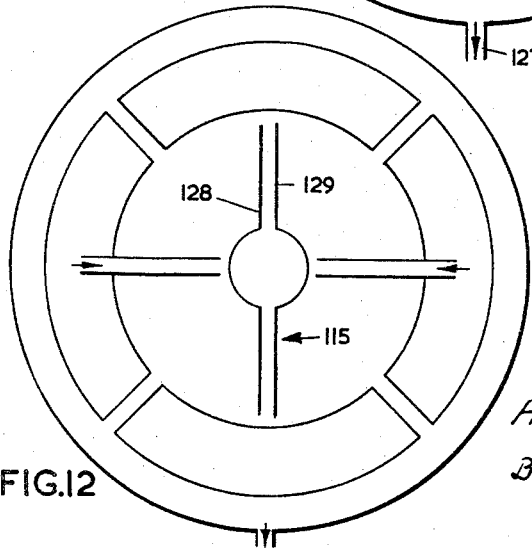
INVENTOR
ALEXANDER IVANOFF
BY Hane and Nydick
ATTORNEYS

United States Patent Office 3,103,179
Patented Sept. 10, 1963

3,103,179
PUMPS
Alexander Ivanoff, Greenwich, Conn., assignor to
Hayward Tyler & Company Limited
Filed Aug. 29, 1961, Ser. No. 134,601
Claims priority, application Great Britain Aug. 29, 1960
5 Claims. (Cl. 103—153)

This invention relates to pumps for pumping liquids.

A pump in accordance with the invention comprises a chamber for the liquid being pumped, an outlet from said chamber, an inlet conduit leading into said chamber for admitting liquid into said chamber, said conduit having a restricted opening through which the interior of the conduit communicates with the liquid in the chamber, and means for effecting oscillating flow of the liquid in the chamber past the restricted opening to create a negative pressure within said conduit, liquid being drawn through said conduit and through said restricted opening into said chamber and exhausted under pressure at the outlet.

Some preferred embodiments of the invention will now be described, by way of example only, with reference to the accompanying drawings, which are purely diagrammatic.

In the drawings:

FIGURES 11 and 11a are elevation and end views respectively of a pump in accordance with yet another embodiment;

FIGURE 12 is an end view of a modified version of the pump shown in FIGURES 11 and 11a; and FIGURE 13 is an elevation of a pump in accordance with still another embodiment.

Figure 1:
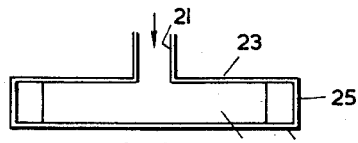
FIGURE 1 is a side elevation of a pump in accordance with one embodiment of the invention.
Figure 1A:
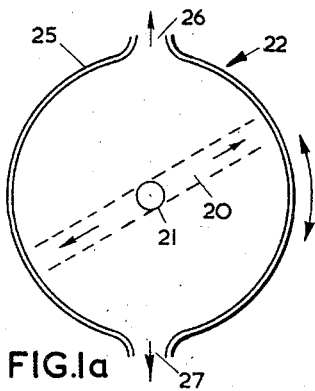
FIGURE 1a is a plan view of the pump shown in FIGURE 1.

The pump illustrated in FIGURES 1 and 1a comprises an impeller consisting of a straight open ended tube 20 mounted for rotational oscillation about an axis at right angles to itself and midway between its ends, and a flexible inlet tube 21 connected to the midpoint of the tube, and communicating with the interior thereof. The impeller is immersed in a mass of fluid contained in a chamber 22, which is formed by a pair of spaced walls 23, 24 joined by a cylindrical wall 25 having outlet openings 26, 27 therein. This chamber can be secured to the impeller for movement therewith or can be stationary.

As the tube 20 oscillates, it acts somewhat as a centrifugal impeller, but the flow through the pump is augmented as follows: as the impeller oscillates, the liquid in which it is immersed flows past the outer ends of the tube 20 first in one direction then in the other and exercises an extraction action on the liquid flowing out of the ends of the tube, with the result that a suction is created inside the tube. Thus the impeller can be regarded as an inlet conduit, the open ends of tube acting as restricted openings through which the interior of the conduit communicates with the liquid in the chambers, the flow through the conduit being caused by the flow of liquid past the said restricted openings.

Instead of a single tube—i.e. two diametrically opposite tubes radiating from a common input point—there could be a greater number of tubes radiating from the said point. Such an arrangement results in a larger flow but somewhat reduced differential pressure.

Figure 2:
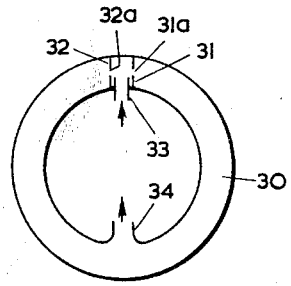
FIGURE 2 is a plan view of a pump according to another embodiment.

The embodiment illustrated in FIGURE 2 comprises an annular chamber in the form of a tubular ring 30, the internal cross-section of whose bore is reduced in one or more places, only one such region of reduced area being shown. This region is defined by a pair of partitions 31, 32 extending across the bore of the ring and having openings therein, whose cross-sectional area is considerably smaller than that of the bore of the ring. For example it may be one tenth of the cross-sectional area of the bore. A tubular inlet conduit 33 passes through the wall of the ring between the partitions, and an outlet 34 is positioned diametrically opposite the inlet.

The tubular ring is oscillated about its own axis thus causing an oscillating flow of the liquid through the region of cross-sectional reduction and this flow creates a suction at this region so that liquid flows into the ring from the inlet conduit 33 and out at the outlet 34.

Figure 2A:
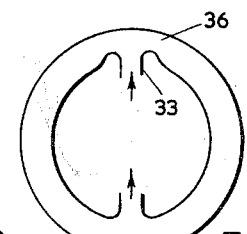
FIGURE 2a is a plan view of a modified version of the pump shown in FIGURE 2.

As an alternative to the use of the partitions 31, 32, the region of reduced cross-sectional area may be constituted by a part of the ring shaped to define a venturi, as shown at 36 in FIGURE 2a. In this case the inlet conduit 33 is connected to the throat of the venturi.

In a modified version, a plurality of regions of cross-sectional reduction may be spaced around the ring, each having its own inlet, and there will be a corresponding number of outlets spaced equidistantly between the inlets.

Figure 4:
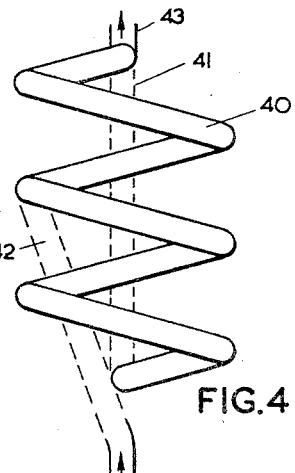
FIGURE 4 is an elevation of a pump in accordance with a further embodiment.

The maximum difference of pressure attainable in such a construction is governed by the length of the liquid column taking part in the oscillation, and can therefore be increased if the column is made longer. This can be achieved by employing a chamber of tubular, helical form (instead of simple annular form), as shown in FIGURE 4. In this case the two ends of a helically coiled tube 40 are connected by a straight tube 41 extending coaxially through the helix, the ends of tube 40 being diretced inwardly, either radially or on a curve to join the straight tube. Thus an endless path for the flow of liquid within the tubes is established, and an inlet conduit 42 communicates with this path at a region of reduced cross-sectional area at the mid point of the tubular helix. An outlet 43 is taken from one end of the straight tube 41, and in effect is simply an extension of that tube beyond one end of the helix. The inlet conduit is coaxial with the helix for a distance and then diverges to join the point of cross-sectional reduction.

The tubular helix is oscillated about its axis and liquid within the tubes 40 and 41 is free to oscillate relative to those tubes past the end of the inlet conduit 42, causing liquid to be drawn through the conduit.

Figure 3:
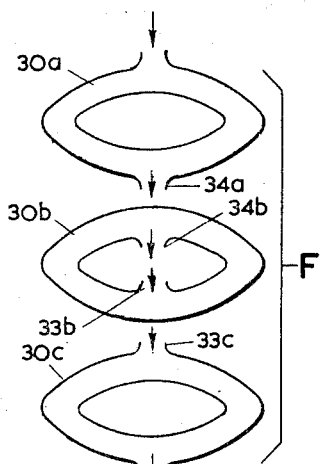
FIGURE 3 is an exploded isometric view of a multi-stage version of the pump shown in FIGURE 2.

In a multi-stage arrangement, illustrated in FIGURE 3, annular chambers 30A, 30B and 30C are connected together in series, outlets 34A, 34B, being connected directly to inlets 33B, 33C.

Figure 5:
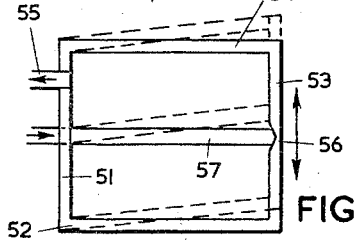
FIGURE 5 is a plan view of a pump according to another embodiment.

In another embodiment, illustrated in FIGURE 5, an endless path for the flow of liquid is formed by four straight tubes 51, 52, 53 and 54 joined at their ends by flexible connections. Tube 51 is fixed and is provided with an outlet 55 while the other tubes are moveable relative to tube 51. The tube 53 opposite the fixed tube has a region 56 of reduced cross-section to which an inlet conduit 57 is connected. The tube 53 is moved reciprocatingly longitudinally of itself to produce oscillating flow along the said endless path.

In an alternative arrangement the outlet is connected to the reciprocating tube 53, and the inlet to the fixed tube 55.

Figure 6:
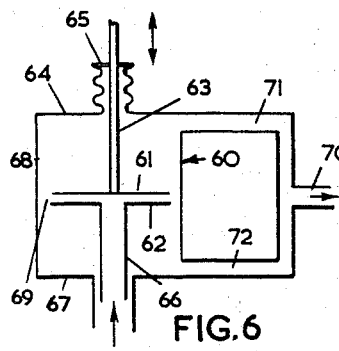
FIGURE 6 is an elevation of a pump in accordance with another embodiment.

A further embodiment of the invention is illustrated in FIGURE 6. A cylindrical chamber 60 is fitted with a piston comprising a pair of spaced discs 61 and 62. One disc 61, is attached at its centre to the end of a piston rod 63 extending outwardly through an aperture in an end wall 64 of the chamber, this aperture being sealed by means of a flexible bellows 65. The other disc has a centrally located aperture to whose edge is sealed an inlet tube 66 which extends outwardly through the other end wall 67 of the chamber. The edges of the discs are spaced from the cylindrical wall 68 of the chamber to define an annular clearance 69 through which the opposite ends of the chamber communicate with each other. The chamber is connected to an outlet 70 through by-pass pipes 71 and 72.

The discs are reciprocated axially of the chamber by means of the piston rod, creating an oscillating flow of liquid in the chamber through the annular clearance 69, and thus across the edges of the discs, which edges between them define a restricted annular opening, thereby creating a suction in the space between the discs. Liquid flows into the space from inlet tube 66, and out through the restricted annular opening between the edges of the discs into the chamber, from whence it passes to one or other of the by-pass pipes 71, 72, to the pump outlet 70. The cross-sectional area and the length of the by-pass pipes 71, 72 is such that the inertia of the liquid in those pipes is sufficient to ensure both that the greater part of the flow is through the clearance 69 (instead of simply from one end of the chamber to the other through the by-pass), and that the delivery from the pump is substantially steady.

Figure 7:
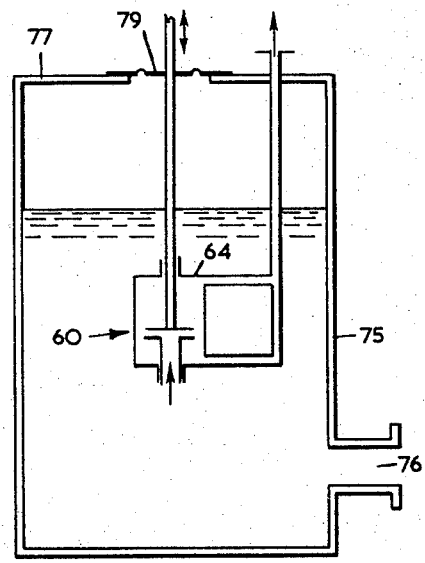
FIGURE 7 is an elevation of a modified version of the pump shown in FIGURE 6.

Preferably, the pump chamber 60 is completely immersed in the liquid to be pumped, as shown in FIGURE 7 in which the chamber is suspended in a tank 75 having an inlet 76. The flexible bellows 65 is dispensed with, the piston rod 63 simply passing with clearance through an aperture in end wall 64 and then through an opening in the upper wall 77 of the tank. This opening may be sealed as shown by means of a flexible diaphragm 78 which permits of the reciprocation of the piston rod.

Figure 8:
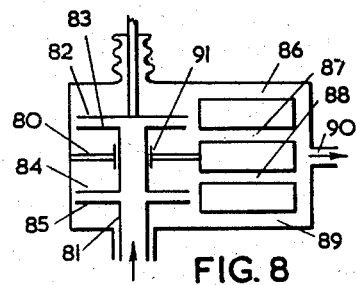

FIGURE 8 illustrates a two-stage version of the last described pump in which the chamber is divided by a partition 80 having a centrally disposed aperture through which the inlet tube 81 extends. The piston comprises two pairs of discs 82, 83 and 84, 85, one pair on each side of the partition and the chamber has four by-pass pipes 86, 87, 88, 89 leading to a common outlet 90. It will be appreciated that such a pump can also be produced as a three or more stage pump.

To minimize the leakage flow through aperture in the partition, a sleeve 91 is provided which fits with clearance around the inlet tube 81. The length of the annular column of liquid filling this clearance, and thus the inertia of the column of liquid, is sufficient to substantially prevent a leakage flow through the clearance.

Figure 9:
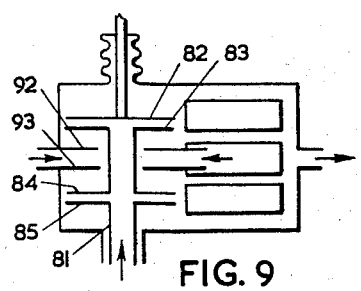
FIGURES 8 and 9 are elevations of further modified versions of the pump shown in FIGURE 6.

In a modified arrangement, illustrated in FIGURE 9, leakage flow between the partition and the piston rod is utilized to augment flow delivered by the pump. The partition comprises a spaced pair of walls 92, 93, the space between the walls being connected to the source of liquid, so that the leakage flow through the central apertures in the walls causes a reduction of pressure in the space between the walls, with consequent flow into the said space from the source of liquid.

Figure 10:
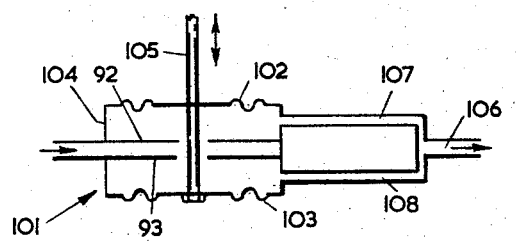
FIGURE 10 is an elevation of a pump in accordance with a further embodiment.

A similar principle is employed in the pump illustrated in FIGURE 10, which comprises a chamber 101 having spaced end walls 102, 103 moveable relative to the side walls 104. These end walls consists of flexible diaphragms, although in an alternative arrangement they may be constituted by pistons fitting closely against the side walls. Two partition walls 92 and 93 extend transversely to the side walls intermediate the end walls. The diaphragms are connected by a piston rod 105 which passes through a centrally disposed aperture in each of the fixed partition walls 92 and 93. As in the last described arrangement the space between the partition walls is connected to the pump inlet and the chamber is connected to an outlet 106 through by-pass pipes 107, 108. In this embodiment the partition walls 92 and 93 constitute an inlet conduit for the pump.

A further embodiment of the invention is illustrated in FIGURES 11 and 11a. This embodiment comprises a cylindrical chamber 110 having end walls 111 and 112. A shaft 113 extends through a centrally disposed aperture in end wall 111, this aperture being sealed by a flexible gaiter 114. The shaft carries a vane 115 extending diametrically of the chamber, this vane having short arcuate flanges 116, 117 at its outer edges which are spaced from the cylindrical wall 118 of the chamber. Inlet pipes or conduits 120 and 121 extend radially into the chamber, with their inner open ends adjacent the axis of the chamber, and outlet pipes 122, 123, 124, 125 in the periphery of the chamber are all connected to a common by-pass pipe 126 having an outlet 127.

In operation the shaft 113 and the vane 115 are oscillated about their common axis thus creating an oscillating flow past the inner ends of the inlet pipes 120, 121 to create a reduced pressure within the pipes. Liquid is thus drawn through the inlet pipes into the chamber and exhausted through outlet pipes 122 etc.

The arcuate flanges 116, 117 secured to the vane act in the same manner as the sleeve 91 shown in FIGURE 8, that is they restrict leakage flow past the outer edges of the vane from one side of the vane to the other.

The pump shown in FIGURE 12 is similar to that shown in FIGURES 11 and 11a, but the leakage flow instead of being restricted is used to augment the mass flow. Thus, the vane 115 comprises a pair of spaced parallel partitions 128 and 129 and the space between these partitions is connected to the pump inlet. The leakage flow past the outer edges of the partitions thus creates a reduced pressure in the space between the partitions with consequent flow of liquid into the space and out between the adjacent edges of the partitions into the chamber. The partitions thus define an additional inlet conduit for the pump.

In each of the above described embodiments, the fact that the moving parts oscillate instead of moving continuously enables flexible connections to be employed which obviate the use of glands, so simplifying the problem of sealing. The nature of the connections has not been fully explained since the same will be within the knowledge of those skilled in the art; thus for example, connections for pumps employing a rotational oscillation may be formed by flexible tubing which is straight and adapted to flex in torsion, or may be suitably shaped or coiled to provide the necessary flexibility. Another form of connection may employ a so-called silent block consisting of tubular layer of flexible material such as rubber sandwiched between inner and outer rigid tubular members. The flexibility of the said material permits the inner member to be given an angular coaxial displacement relatively to the outer member.

The means for effecting oscillation of the moving parts will also be within the knowledge of those skilled in the art and forms no part of the present invention.

A further form of the invention is illustrated in FIGURE 13, which shows a chamber 130 having an outlet 131 at one end. A flexible tube 132 passes in sealed relation through the wall of the chamber, the tube being connected outside the chamber to a source of liquid. The tube is caused to oscillate by means of an electromagnet 131 excited by an alternating current, the movement of the free end of the tube being towards and away from the electro-magnet alternately. Liquid flows into the tube from the said source and flows out through the oscillating open end of the tube within the chamber and then out through the outlet 131.

This pump has the following advantages:
(1) It is glandless.
(2) It has no internal rubbing parts or bearings.
(3) Having no bearings it can pump slurries, paints and other abrasive liquids. It can pump hot and cold liquids and molten metals.
(4) It can be made in a wide choice of materials including carbon or ceramics.
(5) It is not expensive to make.

I claim:
1. A pump comprising a chamber for containing a liquid to be pumped, an outlet from said chamber, means defining a region of reduced cross-section in said chamber, said region being in fluid communication with the remainder of said chamber, a plunger extending with clearance through said region, an inlet communicating with said chamber at said region, and means for oscillating said plunger to cause an oscillating flow of liquid through said region past said inlet.

2. A pump comprising a chamber for containing a liquid to be pumped, a said chamber having spaced end walls, and side walls extending between said end walls, an outlet from said chamber, a pair of spaced parallel partitions extending between said side walls intermediate said end walls and having aligned apertures therein, an inlet connection to the space between said partitions, a plunger extending with clearance through said apertures, and means for reciprocating said plunger longitudinally of said chamber to produce an oscillating flow of liquid through said apertures.

3. A pump comprising a chamber for containing a liquid to be pumped, said chamber having spaced end walls and parallel side walls extending between said end walls, an outlet from each end of said chamber, movable means mounted within said chamber for reciprocating movement longitudially thereof, a pair of spaced parallel plates carried by said movable means for movement therewith, each of said plates extending transversely of said chamber and having its peripheral edge spaced from said side walls, an inlet connection to the space between said plates, and means for reciprocating said movable means longitudinally of said chamber to cause an oscillating flow of liquid through the spaces between the edges of said plates and said side walls.

4. A pump comprising a chamber for containing a liquid to be pumped, said chamber having spaced end walls and side walls extending between said end walls, an outlet from each end of said chamber, a pair of spaced parallel partitions extending transversely of said chamber intermediate said outlets, said partitions dividing said chamber into opposite end portions communicating with one another through a region of reduced cross-section, the space between said partitions communicating with said chamber at said region, an inlet connection to the space between said partitions, and means for producing an oscillating flow of liquid from one end portion to the other end portion of said chamber through said region.

5. A pump comprising a chamber for containing a liquid to be pumped, said chamber having spaced end walls and parallel side walls extending between said end walls, a liquid outlet at each end of said chamber, a pair of spaced parallel partitions located between said outlets and extending between said side walls, said partitions having aligned apertures therethrough, a plunger extending with clearance through said apertures, said plunger being movable longitudinally of said chamber, a liquid inlet connected to the space between said partitions, a pair of spaced parallel plates carried by said plunger on each side of said pair of partitions, the plates of each pair extending transversely of said chamber and having their peripheral edges spaced from said side walls, a liquid inlet communicating with the space between each pair of plates, and means for reciprocating said plunger longitudinally of said chamber for causing an oscillating flow of liquid through said apertures and through the spaces between the edges of said plates and said side walls.

References Cited in the file of this patent
UNITED STATES PATENTS

| | | |
|---|---|---|
| 260,921 | Alpuche | July 11, 1882 |
| 2,273,896 | Simms et al. | Feb. 24, 1942 |
| 2,305,022 | Mikina | Dec. 15, 1942 |
| 2,508,950 | Kaplan | May 23, 1950 |
| 2,872,877 | Brewer | Feb. 10, 1959 |
| 2,954,736 | Garland | Oct. 4, 1960 |